May 23, 1967 G. THESING 3,320,718
APPARATUS FOR FILLING AND SEALING CONTAINERS
Filed June 1, 1964 3 Sheets-Sheet 1

Inventor:
Georg Thesing
by Michael J. Striker

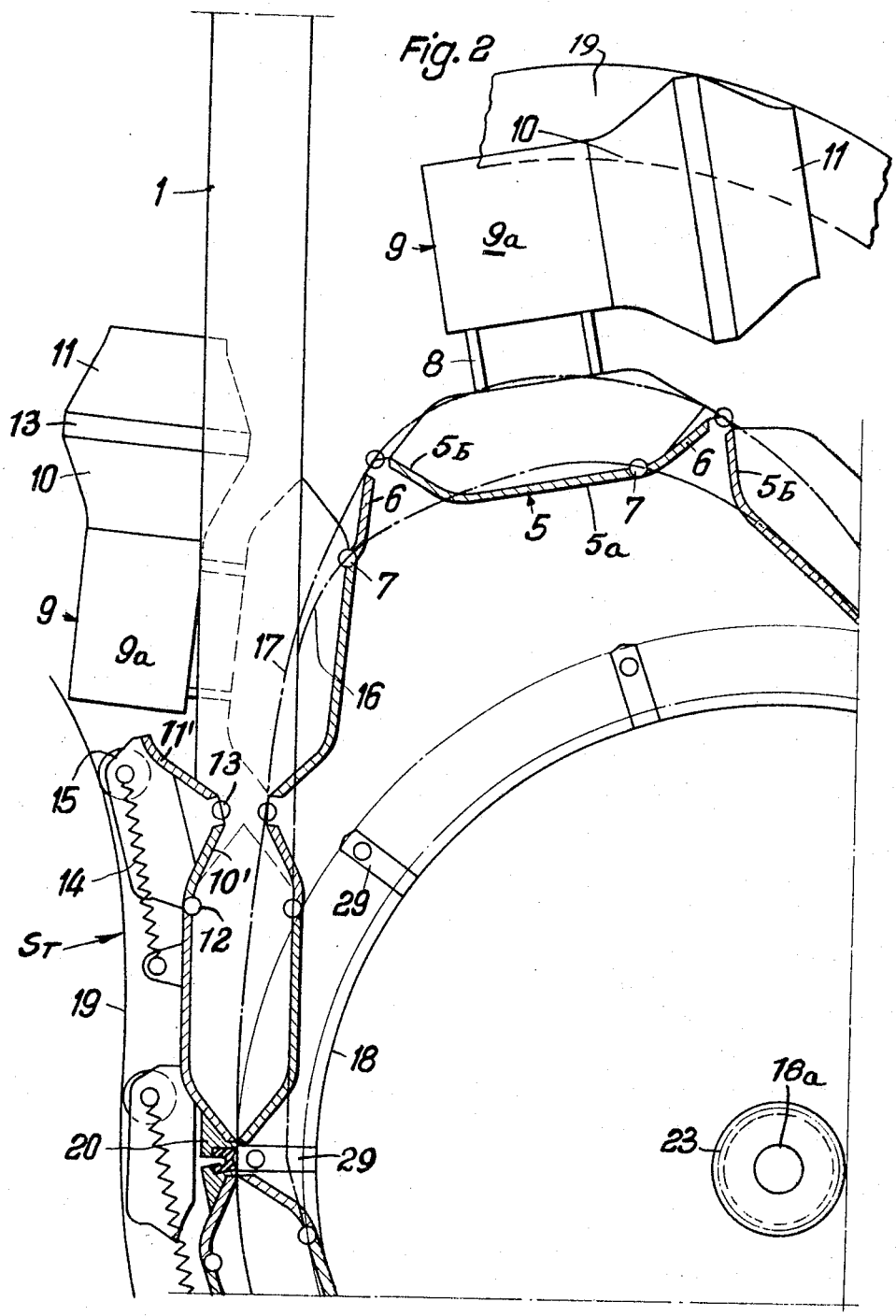

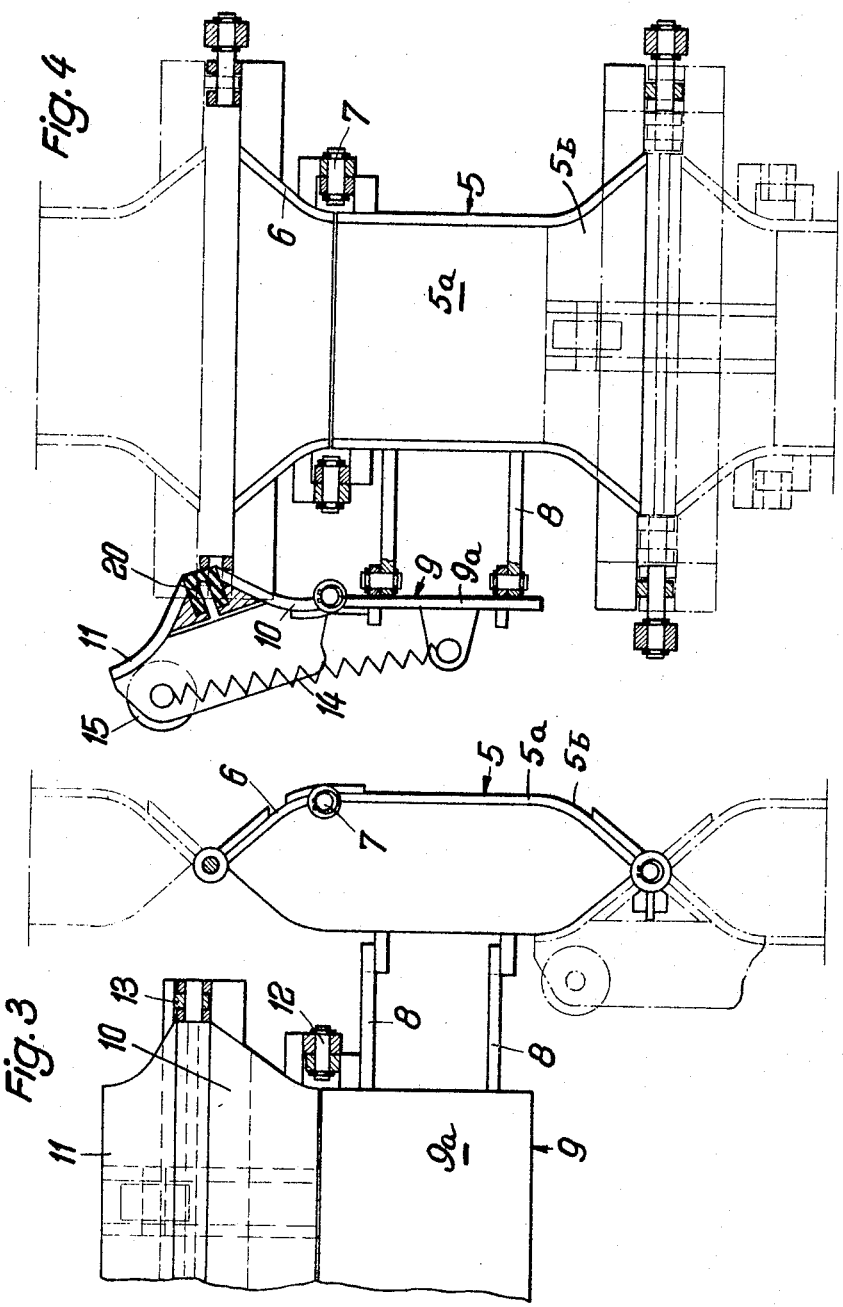

3,320,718
APPARATUS FOR FILLING AND SEALING
CONTAINERS
Georg Thesing, Dortmund-Schonau, Germany, assignor to Holstein & Kappert Maschinenfabrik "Phonix" GmbH, Dortmund, Germany
Filed June 1, 1964, Ser. No. 371,275
13 Claims. (Cl. 53—180)

The present invention relates to an apparatus for making containers from paper tubes or plastic tubes and for filling such containers with flowable liquid or pulverulent material. More particularly, the invention relates to an apparatus for mass producing substantially pillow shaped containers.

It is an important object of my invention to provide an apparatus for forming, filling and heat-sealing containers in a continuous operation, at high speed, and in a fully automatic way.

Another object of the invention is to provide an apparatus of the just outlined characteristics wherein the containers are formed by molds of novel construction which insure that each container receives an accurately measured quantity of flowable material and that all containers are of identical size and shape.

A further object of the invention is to provide an apparatus for the production of thermoplastic or plastic-coated containers wherein the containers may be formed, filled and sealed in rapid sequence, without any supervision and with utmost accuracy regardless of their size and shape.

Still another object of the invention is to provide a novel mold which may be used in an apparatus of the above outlined type.

A concomitant object of the invention is to provide an endless conveyor which includes a series of novel molds and which insures uniformity in the filling, shaping and sealing action upon consecutive containers.

With the above objects in view, one feature of my invention resides in the provision of an apparatus for filling a heat-sealable tube with flowable material and for heat-sealing the tube transversely at spaced intervals to form a row of filled containers. The apparatus comprises guide means arranged to direct the tube endwise toward a sealing station, filling means including a suitable mandrel which is arranged to admit into the tube a stream of flowable material so that each length of tube which enters the sealing station is filled with such material, deforming means including a series of normally open molds of the open-and-shut type arranged to travel past the sealing station so that each consecutive mold receives a length of tube, a guide rail or the like for closing the molds consecutively at a point past the sealing station in order to flatten portions of the tube and to thus form transverse webs which separate lengths of tube from each other, and heat-sealing means comprising welding jaws arranged to travel past the sealing station and to weld each consecutive web whereby the lengths of tube between such welded webs form a row of sealed containers.

It is preferred to guide the tube downwardly in a vertical or nearly vertical path and to assemble the molds into a chain of molds which may be driven by a wheel-shaped carrier for the welding jaws. The chain of molds is caused to travel in an endless path which is substantially tangential to the path of the tube, and the sealing station is located at the juncture of the two paths.

The containers may be severed from each other in a fully automatic way, and the thus obtained single file of independent containers may be advanced to the next processing station. The materail which fills the containers may be a readily flowing liquid substance, a liquid substance of medium or high viscosity, a powder, or a dispersion of comminuted solid material in a liquid phase.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of a specific embodiment with reference to the accompanying drawings, in which:

FIG. 2 is a greatly enlarged view of the sealing station;

FIG. 3 is a side elevational view of an open-and-shut mold; and

FIG. 4 is a top plan view of a mold in open position.

Figure 1:
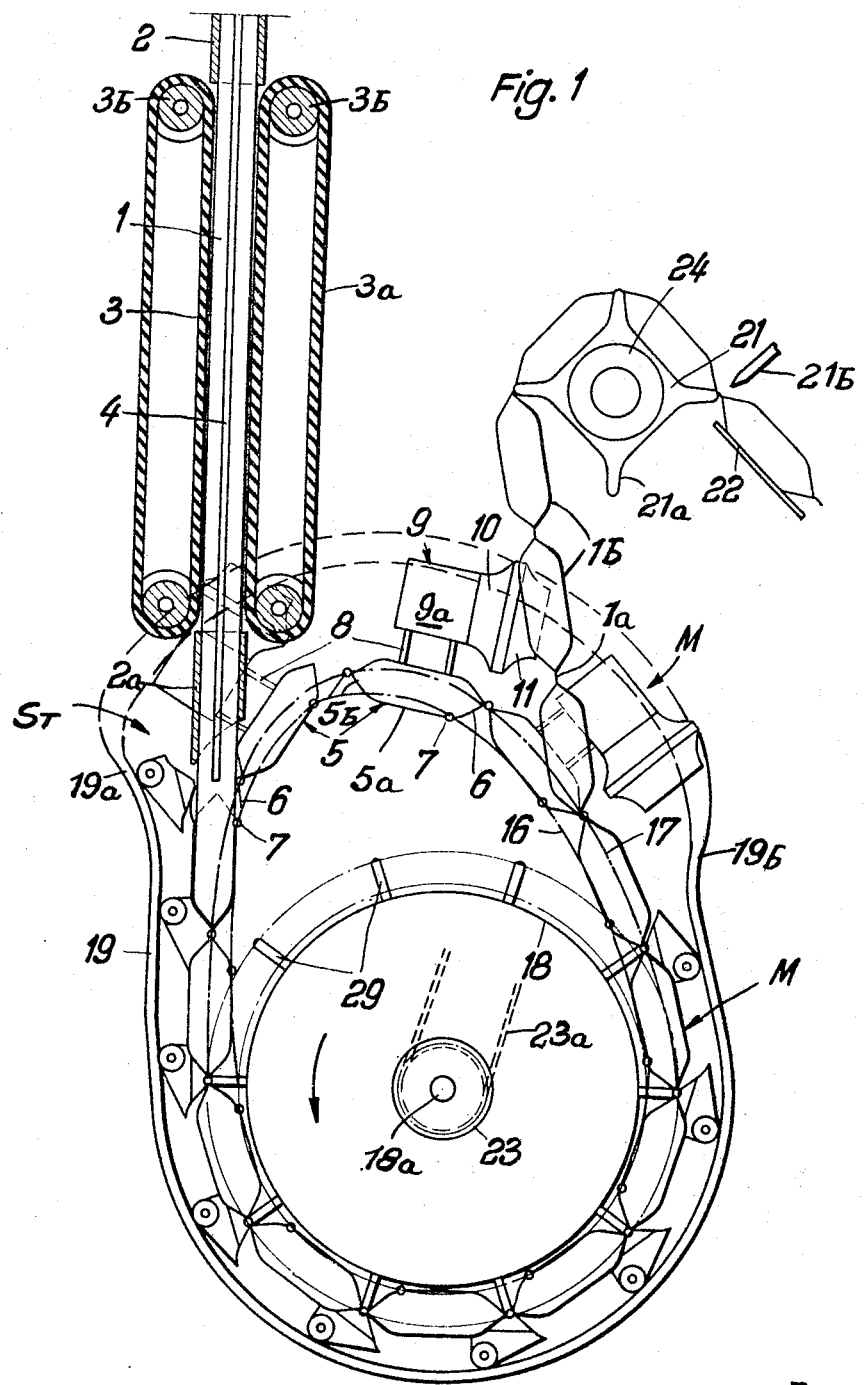
FIG. 1 is a somewhat schematic front elevational view of an apparatus which is used in the production of pillow shaped or cushion shaped fluid-filled containers and which embodies the invention.

Referring to the drawings, and first to FIG. 1, there is shown an apparatus which is used for forming, filling and sealing plastic containers of the type resembling a pillow or a cushion of rectangular or other polygonal outline. The apparatus comprises guide means for directing a continuous length of thermoplastic tube or plastic-coated paper tube 1 endwise in a substantially vertical path so that the tube 1 travels downwardly to enter a sealing station ST at which it is flattened at regular intervals to develop transverse webs 1a serving to separate the thus obtained pillow shaped containers 1b from each other. The guide means comprises a fixed upper tubular guide 2, a fixed lower tubular guide 2a, and a pair of endless belts 3, 3a which are trained around rollers 3b and which include spaced parallel stringers extending between the guides 2 and 2a at the opposite sides of the tube 1. A fixed filling mandrel 4 extends into the interior of the tube 1 and serves to admit into this tube a stream of flowable material, preferably a liquid or liquefied substance, which forms a column having a height which suffices to insure proper metering of material in consecutive containers 1b. It is to be noted here that the tube 1 is obtained in conventional manner by folding the marginal portions of a continuous thermoplastic or plastic-coated paper web over each other and by thereupon bonding the overlapping marginal portions to each other to form a complete tube. As known, the point where the mandrel 4 extends into the interior of the tube 1 is located above the level of the heat-sealing device which bonds the overlapping marginal portions to each other. A machine for the production of such tubes is disclosed, for example, in U.S. Patent No. 3,048,951. In the embodiment of FIGS. 1 to 4, the mandrel 4 spreads the tube 1 to form a body of rectangular cross section.

In accordance with the present invention, the containers 1b are formed by an endless chain which includes a series of consecutive open-and-shut molds M each having a tray-shaped first section or bottom member 5 and a second section or lid 9. Each bottom member 5 comprises a central or median portion 5a having a trailing edge provided with a hinge 7 for a rear end portion or flap 6. Each lid 9 comprises a front portion 9a which may overlap the median portion 5a of the respective bottom member 5, a median portion 10 which is secured to the front portion 9a by a hinge 12, and a rear end portion 11 which is secured to the intermediate portion 10 by a hinge 13. The intermediate portion 10 of each lid 9 may overlap the rear end portion 6 of the respective bottom member 5 and the rear end portion 11 may overlap the front end portion 5b of the bottom member 5 in the next-following mold M. As best shown in FIG. 2, the molds M are normally open and are guided in an endless path in such a way that each thereof remains open at the time the respective median portion 5a is adjacent to the path of the tube 1, whereupon the molds close to flatten the tube at longitudinally spaced intervals and to hold the tube in such deformed state at the time the latter is subjected to a welding action to heat-seal each consecutively formed transverse web 1a so as to entrap a measured quantity of flowable material in the interior of the thus obtained container 1b.

Each lid 9 is hinged to the respective bottom member 5 by a pair of spaced arms or straps 8 which connect the median portions 5a with the corresponding front portion 9a. Springs 14 are provided respectively connected at opposite ends to the front portion 9a and the rear end portion 11 of each lid 9 to normally keep the lids 9 in idle position in which the portions 10 and 11 take the positions shown at 10', 11' in FIG. 2. Each rear end portion 11 carries a roller follower 15.

The apparatus further comprises tracks 16 and 17 to guide the bottom members 5 in an endless oval path (see particularly FIG. 1) which surrounds a driver wheel 18 for the chain of molds M. The path of the tube 1 along the guide means 2, 2a, 3 and 3a is substantially tangential to the driver wheel 18. A lower portion of a guide rail 19 is disposed around the lower portion of the wheel 118 and upper portion of the guide rail 19, between the portions 19a and 19b, is twisted through 90° and is spaced farther from the wheel 19, thus permitting the molds 14 to open. At the portion 19a the guide rail extends toward and along the sealing station ST to serve as a closing device by guiding the followers 15 connected to the rear and portions 11 of the lids in a sense to automatically close the molds M at requisite intervals and at a point past the station ST in order to form the containers 1b and webs 1a. Thus, the guide rail 19 causes the portions 10, 11 of consecutive lids 9 to pivot against the bias of the respective springs 14 and to overlap the corresponding parts of the associated bottom members 5.

The driver wheel 18 serves as a carrier for radially outwardly extending heat-sealing or welding jaws 29 which are equidistant from each other and which are arranged in such a way that each thereof may extend into the space between the edge of a rear end portion 6 on a preceding bottom member 5 and the edge of a front end portion 5b on the next-following bottom member. The jaws 29 are comparable to the teeth of a sprocket wheel which enter into the gaps between the links of an endless chain defined by the bottom members 5, and these jaws cooperate with complementary heat-sealing or welding jaws 20 which are provided on the lids 9. As best shown in FIGS. 2 and 4, each jaw 20 is disposed between the portions 10, 11 of the respective lid 9 and will cooperate with a jaw 29 when the respective mold M is closed. The manner in which such jaws may be heated to welding temperature is known in the art and is not shown in the drawings.

As stated above, the guide rail 19 surrounds the lower half of the driver wheel 18 and its portion 19b flares away from the periphery of the driver wheel so that the springs 14 may open the respective molds M and may allow freshly formed containers 1b to leave the cavities of the bottom members 5 and to advance toward a star-shaped conveyor 21 which delivers the containers onto an inclined chute 22. The conveyor 21 is rotated by a sprocket 24 which is driven by a sprocket 23 through a chain 23a. The sprocket 23 is mounted on the shaft 18a of and is driven by the wheel 18. The prongs 21a of the conveyor 21 may constitute knives to sever the webs 1a and to thus separate the containers 1b from each other. It is also possible to use the prongs 21a as backup members for a separate knife 21b which is driven or reciprocated by a suitable mechanism to sever the webs 1a.

The apparatus of my invention operates as follows:

The guide means 2, 2a, 3 and 3a direct the tube 1 toward the sealing station ST at the left-hand end 19a of the rail 19 whereby the tube 1 may advance at constant speed or intermittently, depending on the manner in which the carrier wheel 18 is rotated. The mandrel 4 fills the tube 1 up to a predetermined level so that each length of tube which enters the station ST is filled with flowable material. The wheel 18 drives the molds M to thereby pull the tube 1 downwardly and to cause the molds to close seriatim whenever a follower 15 engages the end portion 19a and begins to travel along the rail 19. Thus, the molds M are of the open-and-shut type and are kept open automatically by the action of springs 14 while travelling toward and past the station ST to close immediately thereafter by the cam action of the rail 19 and to thus flatten longitudinally spaced portions of the tube 1 to form the webs 1a. These webs are then welded by cooperating pairs of jaws 20 and 29 whereby the lengths of tube 1 between the welded webs 1a form a row of sealed containers 1b. Such containers are then caused to leave the respective molds M as soon as the springs 14 are permitted to open the molds (at a point past the right-hand end 19b of the rail 19, as viewed in FIG. 1), and the webs 1a are severed by the prongs 21a or by the knife 21b to form a row of independent containers which descend along the chute 22 to a packaging or storing station, not shown.

If desired, the lids 9 may constitute a second series of elements which need not be positively coupled with the bottom members 5. Thus, and if desired, the track 16 may be used to guide an endless series of bottom members 5 and the track 17 may be used to guide a similar endless series of lids 9. Of course, translatory movements of the lids 9 and of the bottom members 5 must be synchronized to insure that each lid will cooperate with the respective bottom member to properly flatten a portion of the tube 1 at regular intervals and to form the webs 1a which are sealed by the jaws 20, 29.

The manner in which the bottom members 5 and lids 9 of each consecutive mold M cooperate to form the webs 1a is best shown in FIG. 2. It will be noted that the length of tube which is received in the cavity of a section 5 is first clamped at its leading end in that the rear end portion 11 of the preceding lid 9 moves against one side of the tube while the front end portion 5b of the bottom member 5 engages the other side of the tube to flatten the same and to form a web 1a at the leading end of a freshly formed container 1b. The web 1a at the trailing end of the same container is formed by the rear end portion 6 of the bottom member 5 and by the adjacent zones of the portions 10, 11 on the cooperating lid 9. Thus, the sections 5 and 9 of consecutive molds define pockets which receive equal lengths of tube 1 and which then pinch the front and rear ends of such lengths to keep the webs 1a in flattened condition during their travel through and beyond the state ST, i.e., until the webs are heat-sealed to provide fluidtight partitions between consecutive measured quantities of flowable material.

The configuration of the tracks 16, 17 is preferably selected in such a way that they assist the springs 14 in opening the molds immediately past the end portion 19b of the guide rail 19.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. An apparatus for filling a heat-sealable tube with flowable material and for heat-sealing the tube transversely at spaced intervals to form a row of filled containers, comprising guide means arranged to direct the tube endwise toward a sealing station; filling means arranged to admit into the tube a flowable material so that consecutive lengths of tube which enter said station are filled with such material; deforming means comprising a series of normally open molds arranged to travel past said station so that each consecutive mold receives a length of tube, each mold comprising only two sections and each section including at least two portions articulately connected to each other; means for closing said molds seriatim at a point past said station so that the molds flatten portions of the tube to form transverse webs which separate consecutive lengths of tube from each other; and heat-sealing means comprising welding jaws arranged to travel past said station and to weld each consecutively formed web whereby the lengths of tube between such webs form a row of sealed containers.

2. An apparatus as set forth in claim 1, wherein each mold section comprises a front portion, a median portion and a rear portion, and wherein the front and median portions of one section respectively overlie the median and rear portions of the other section in each mold, the rear portion of each one section overlying the front portion of the other section in the next-following mold when the molds are closed.

3. In an apparatus for producing containers from heat-sealable tubing, in combination, deforming means comprising a series of molds each including a first and a second section and each section having a front, median and rear portion whereby the front and median portions of said second sections register with the median and rear portions of the corresponding first sections and the rear portions of said second sections register with the front portions of the next-following first sections; hinge means providing articulate connections between the median and rear portion of each section; means for advancing said molds in an endless path; means for opening said molds seriatim along selected portions of said path; and means for cloinsg said molds seriatim along the remaining portions of said path.

4. A combination as set forth in claim 3, wherein each of said second sections further comprises hinge means providing articulate connections between the front and median portions of the respective second sections.

5. A combination as set forth in claim 3, further comprising hinge means articulately connecting the front portions of said second sections to the median portions of the corresponding first sections.

6. In an apparatus for producing containers from heat-sealable tubing, in combination deforming means comprising a series of molds each including a first and a second section and each section having a front, median and rear portion whereby the front and median portions of said second sections register with the median and rear portions of the corresponding first sections and the rear portion of said second sections register with the front portions of the next-following first sections; hinge means providing articulate connections between the median and rear portion of each section; means for advancing said first and second sections in separate endless paths; means for opening said molds seriatim along selected portions of said paths; and means for closing said molds seriatim along the remaining portions of said paths.

7. In an apparatus for producing containers from heat-sealable tubing, in combination, deforming means comprising a series of molds each including a first and a second section and each section having a front, median and rear portion whereby the front and median portions of said second sections register with the median and rear portions of the corresponding first sections and the rear portions of said second sections register with the front portions of the next-following first sections; means for advancing said molds in an endless path located in a vertical plane, said advancing means comprising a wheel having radial teeth extending between consecutive molds; means for opening said molds seriatim along selected portions of said path; and means for closing said molds seriatim along the remaining portions of said path.

8. A combination as set forth in claim 7, wherein said teeth are welding jaws and wherein each mold comprises a complementary welding jaw arranged to cooperate with a welding jaw of said wheel along a portion of said path.

9. A combination as set forth in claim 8, wherein said complementary jaws are disposed intermediate the median and rear portions of the respective second sections.

10. A combination as set forth in claim 7, wherein said path comprises a first portion which follows the outline of said wheel and a second portion which is spaced from the periphery of said wheel.

11. An apparatus as set forth in claim 1, and including a wheel arranged to advance the molds past said station, said heat sealing means comprising welding jaws mounted on said wheel for travel past said station.

12. An apparatus as set forth in claim 1, wherein each of said molds comprises a follower and wherein said closing means comprises a guide rail located in said path of said followers and extending along a portion of the path of said molds.

13. An apparatus as set forth in claim 1, wherein said molds are arranged to travel in an oval path which is tangential to the path of said tube.

References Cited by the Examiner

UNITED STATES PATENTS

| | | | |
|---|---|---|---|
| 2,157,467 | 5/1939 | Thurlings | 18—21 X |
| 2,840,961 | 7/1958 | Karpowicz | 53—180 X |
| 2,966,021 | 12/1960 | Lane et al. | 53—182 |

FOREIGN PATENTS

| | | |
|---|---|---|
| 509,427 | 3/1952 | Belgium. |
| 1,104,422 | 4/1961 | Germany. |
| 1,124,865 | 3/1962 | Germany. |

TRAVIS S. McGEHEE, *Primary Examiner.*

FRANK E. BAILEY, *Examiner.*

N. ABRAMS, *Assistant Examiner.*